United States Patent [19]

Tokura

[11] Patent Number: 5,336,352
[45] Date of Patent: Aug. 9, 1994

[54] METHOD FOR FORMING A TRIM COVER ASSEMBLY FOR AUTOMOTIVE SEAT

[75] Inventor: Hisaya Tokura, Ohme, Japan

[73] Assignee: TACHI-S Co., Ltd., Tokyo, Japan

[21] Appl. No.: 51,212

[22] Filed: Apr. 23, 1993

[51] Int. Cl.⁵ .................. B32B 31/04; B32B 31/10; B32B 31/20

[52] U.S. Cl. .................. 156/214; 156/274.4; 156/274.8; 156/275.1; 156/380.5; 156/380.8; 156/477.1; 156/581; 297/DIG. 1; 297/DIG. 2

[58] Field of Search .............. 156/212, 214, 274.4, 156/275.1, 274.8, 285, 380.5–380.6, 380.8, 475, 477.1, 581; 297/DIG. 1–DIG. 2

[56] References Cited

U.S. PATENT DOCUMENTS

| | | | |
|---|---|---|---|
| 2,640,517 | 6/1953 | De Mello | 156/581 X |
| 2,744,564 | 5/1956 | Woodburn | 156/477.1 X |
| 3,052,587 | 9/1962 | Spieles | 156/274.8 X |
| 3,244,571 | 4/1966 | Weisman | 156/274.4 X |
| 4,002,520 | 1/1977 | Fenton | 156/274.4 X |
| 4,323,410 | 4/1982 | Urai | |
| 4,352,709 | 10/1989 | Urai et al. | 156/274.4 X |
| 4,559,094 | 12/1985 | Hostetler et al. | 156/212 |
| 4,722,760 | 2/1988 | Shimada | 156/214 |
| 4,867,826 | 9/1989 | Wayte | 156/274.8 X |
| 4,979,890 | 12/1990 | Bracesco | 156/581 X |
| 5,032,206 | 7/1991 | Sigerist | 156/212 X |
| 5,181,980 | 1/1993 | Yanagishita | 156/214 X |
| 5,238,513 | 8/1993 | Gill | 156/212 X |

FOREIGN PATENT DOCUMENTS

| | | | |
|---|---|---|---|
| 58-168517 | 10/1983 | Japan | 156/274.8 |
| 462722 | 3/1975 | U.S.S.R. | 156/380.8 |

Primary Examiner—Michael W. Ball
Assistant Examiner—Adrienne C. Johnstone
Attorney, Agent, or Firm—Browdy and Neimark

[57] ABSTRACT

A device and method for forming a trim cover assembly for an automotive seat, wherein a top cover layer is stretched and pressed on a lower die by plural upper die elements in the outward direction and symmetrically relative to a central line of the lower die, to thereby place the top cover layer without clearance and slackened area therein, upon the lower die, and then a foam wadding and a wadding cover are fixed to the thus-pressed top cover layer. Thus, the resulting trim cove assembly is formed with a clear-cut or very distinct pattern of recessed grooves thereon.

4 Claims, 5 Drawing Sheets

METHOD FOR FORMING A TRIM COVER ASSEMBLY FOR AUTOMOTIVE SEAT

BACKGROUND OF INVENTION

1. Field of Invention

The present invention relates to a method for forming a trim cover assembly for an automotive seat, and a device for carrying out such method.

2. Description of Prior Art

In conventional trim cover assembly for an automotive seat, plural patterns of recessed grooves (a')(a')(a') formed on its surface are used for the purpose of improving the outer appearance of the seat, as shown in FIG. 1(A). This sort of trim cover assembly (C) is of a three-lamination type comprising a top cover layer (I) (made of woven fabric, synthetic resin leather, etc.), a foam wadding (2) (preferably a slab urethane foam material), and a wadding cover (3) (preferably a nonwoven fabric). These three layers material (I)(2) (3) are locally pressed and welded together by a high-frequency welding device as shown in FIG. 1(B) to form the illustrated patterns of stripe-like recessed grooves (a')(a')(a').

The formation of such patterns is effected by a conventional method using an upper die (U) and a lower die (R), which consists of the steps of placing the three layers, i.e. the top cover layer (1), foam wadding (2) and wadding cover (3) on the lower die (R), in this order, and then the upper die (U) is lowered to press and weld the three layers (1)(2)(3) at the points corresponding to plural projected electrode portions (10) . . . to form such patters of recessed grooves (a') . . . on the top cover layer (1).

However, this conventional method has been insufficient to achieve a clear-cut profile of each pattern (a'). That is, as seen from FIGS. 1(A), each resulting pattern (a') does not result in clear-cut corners and loosens to form undesired arcuate corners.

Another solution to this problem, referring now to FIGS. 1(C) and 1(D), has been proposed, which employs another improved high-frequency welding device comprising a flat upper die (U') and a suction-type lower die (R') having plural equidistant projected electrodes (11, 12, 13 . . . ) as shown in FIG. 1(C). The lower die (R') is formed in a box-like configuration having a hollow therein, having a plurality of suction holes (101 . . . ) perforated in the upper wall thereof, each of which is defined in the respective sections partitioned by the foregoing plural projected electrodes (11, 12, 13 . . . ), and a tube (32A) connected to a suitable air suction device (not shown). In this technique, the three-layer trim cover assembly to be formed utilizes a plurality of separate foam waddings (2a)(2b)(2c)(2d)(2e)(2f), each being of a clear-cut square shape in section. The top cover layer (1) and wadding cover (3) are the same with those of the foregoing first prior art. In brief, the forming steps consist of firstly placing the top cover layer (1) on the plural projected electrodes (11, 12, 13 . . . ) of lower die (R'), then forcibly attracting the top cover layer (1) to the lower die (R') as well as to the plural projected electrodes (11, 12, 13 . . . ) by sucking air through the suction holes (101 . . . ) through operation of the air suction device, next placing the separate waddings (2a, 2b . . . ) and wadding cover (3), in this order, upon the top cover layer (1) thus secured to the lower die (R'), and finally subjecting those three layers to a high-frequency welding, with a pressure plate (P) lowered to press them against the lower die (R'). This approach makes more effective in rendering clear or distinct the resulting pattern of recessed grooves in the trim cover assembly, owing to the forcible attraction of the top cover layer (1) to the lower die (R') and the separate waddings (2a, 2b . . . ).

But, this particular second prior-art technique is still insufficient to attain a completely clear-cut corners on each pattern produced thereby, because of such clearances (H) being created symmetrically relative to each of the projected electrodes (11, 12 . . . ), as depicted in FIG. 1(D), even though the the top cover layer (1) is drawn to the upper surface of the lower die (R). Consequently, the clearances (H) result in the top cover layer (1) pressing the corners of each separate padding (2a, 2b . . . ) and making them arcuate, with the result that the four corners of resulting patterns of recessed grooves (see FIG. 8 for reference only ) do not result in clear-cut or distinct corners conforming to those of rectangular profile of each separate padding (2a, 2b . . . ). This impairs the aesthetic appearance of seat.

SUMMARY OF THE INVENTION

In view of the above-stated drawbacks, it is a first purpose of the present invention to provide an improved method for forming a trim cover assembly, which produce clear-cut or distinct patterns of recessed grooves on the surface thereof.

In order to attain such purpose, in accordance with the present invention, there is basically provided a new method involving the steps of providing a lower die having a working surface formed with a plurality of projected portions thereon. The projected portions extend in a longitudinal direction of the lower die and are arranged generally in parallel with one another in a width-wise direction of the lower die. A plurality of upper die elements which are vertically movable toward and away from the lower die is also provided. Thereafter, the top cover layer is placed upon the lower die. Thereafter, some of the upper die elements are sequentially lowered towards the lower die, in such a manner that they are lowered one set after another set in an outward direction from and symmetrically relative to a central line of the lower die, to thereby press the top cover layer against the working surface of lower die. Thereafter the top cover is held in place on the lower die by a vacuum produced by an air suction device. Then, all the upper die elements thus lowered are raised from the lower die and foam wadding and a wadding cover, in this order are placed upon the thus-pressed top cover layer on the lower die. Then a pressure plate is lowered and pressed against all three layers on the lower die, so that they are fixed together integrally to produce a trim cover assembly with patterns of recessed grooves created thereon.

Accordingly, the top cover layer starts to be pressed at its central area, creating a first recessed groove pattern without any clearance, after which, the remaining area of top cover layer is subject to progressive stretching in the outward direction from and symmetrically relative to the central point by the sequential pressing operations of the plural upper die elements at every symmetrical pair of projected portions of lower die. Thus, the resulting trim cover assembly is formed with a clear-cut or more distinct pattern of recessed grooves thereon.

Preferably, the foam wadding may comprise a plurality of separate foam wadding pieces and they may be fitted to the respective portions of the top cover layer which have been defined in the intervals among the projected portions on the lower die, during the step of placing the wadding and wadding cover on the pressed top cover layer on the lower die.

It is a second purpose of the present invention to provide a device for carrying out the foregoing method.

To this end, in addition to the above-said lower die, in accordance with the invention, the device includes an upper die assembly and a pressing means. The upper die assembly includes the foregoing plural upper die elements, with such a construction that, among them, there is a central upper die element disposed centrally of the assembly, which is provided with a recessed part into which the corresponding central projected portion of the lower die is to be engaged, and other remaining upper die elements constitute plural symmetrical sets in relation to the central upper die element. The central upper die element is firstly lowered toward the lower die for engagement with the central projected portion thereon, and then the plural symmetrical sets of other upper die elements will be lowered in sequence, one after another, toward the lower die, such as to sandwich the respective said projected portions other than the central one in the lower die. The pressing means may comprise the foregoing pressure plate.

DETAILED DESCRIPTION OF PREFERRED EMBODIMENT OF THE INVENTION

Figure 2:
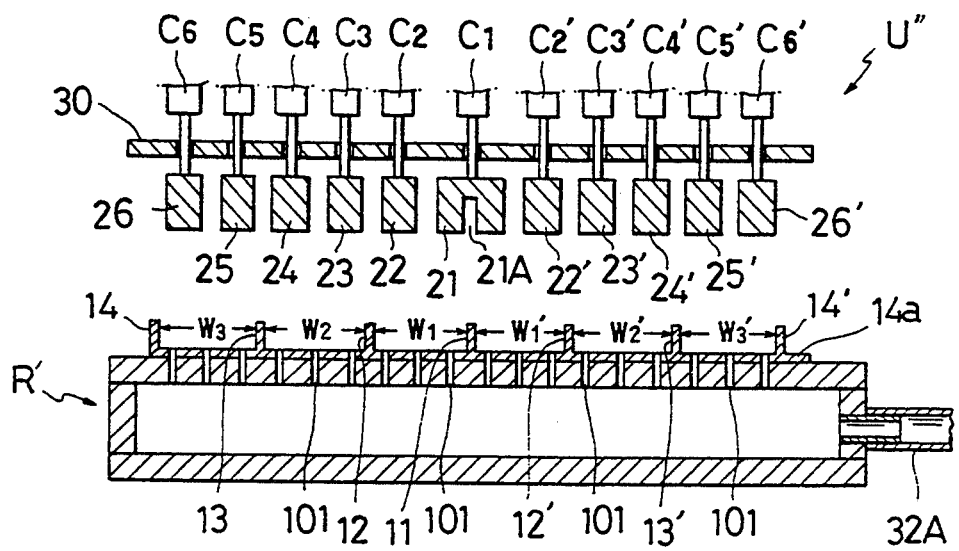
FIG. 2 is a schematic sectional view showing a principal part of device in the present invention.
Figure 3:
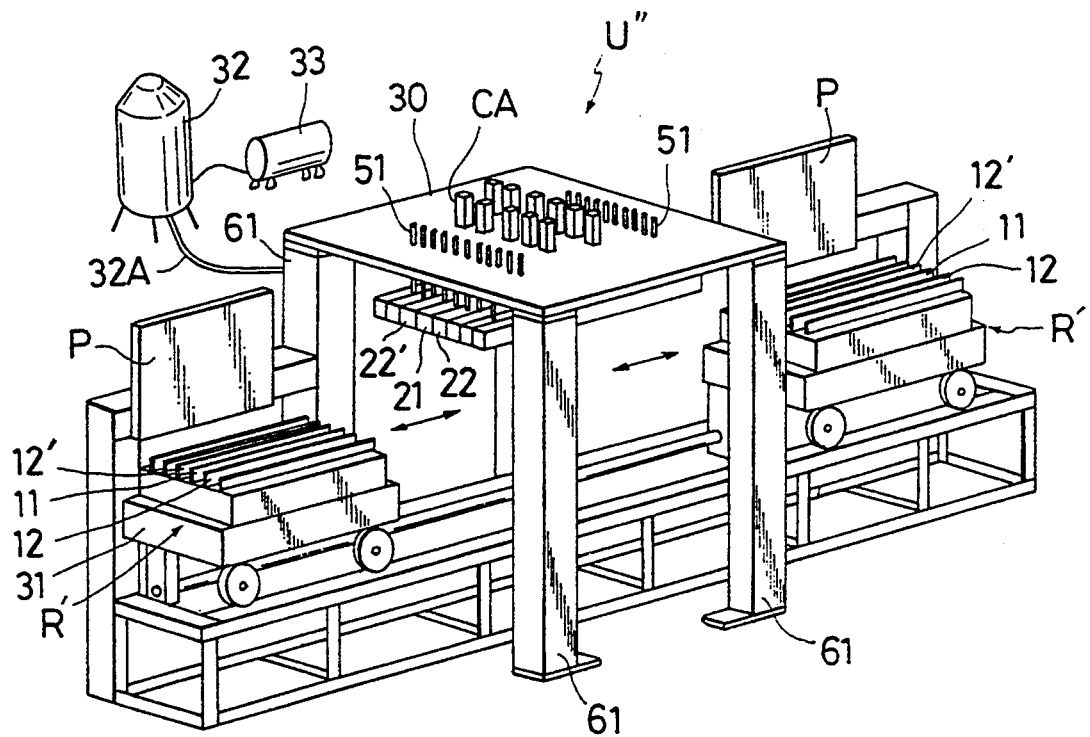
FIG. 3 is a schematic perspective view of a whole appearance of the device.

Referring to FIGS. 2 and 3, there is illustrated a device for forming a trim cover assembly in accordance with the present invention.

Figure 1:
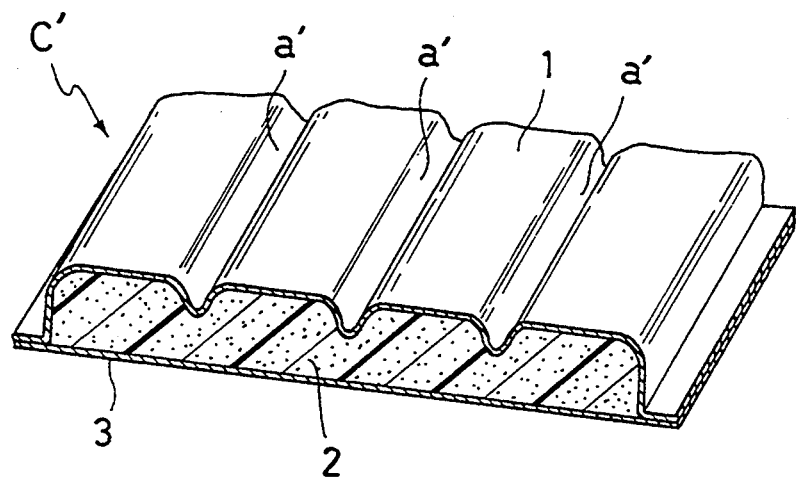
FIG. 1(A) is a partly broken perspective view of a trim cover assembly formed by a conventional method.
FIG. 1(B) is a schematic sectional view showing a first conventional device and method for forming the trim cover assembly.
FIG. 1(C) is a schematic sectional view showing a second conventional device and method.
FIG. 1(D) is an partly enlarged view of the part (A) in the FIG. 1(C)
Figure 1:
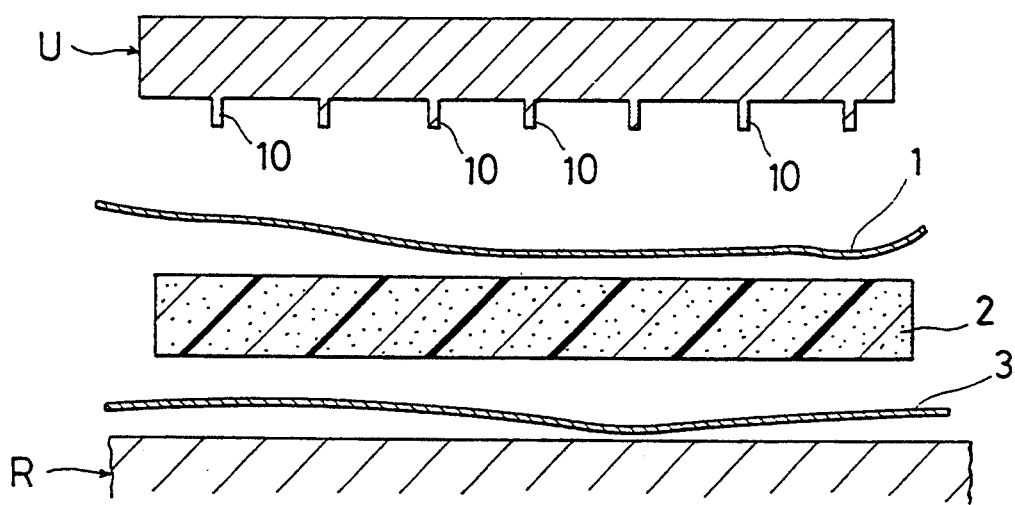
Figure 1C:
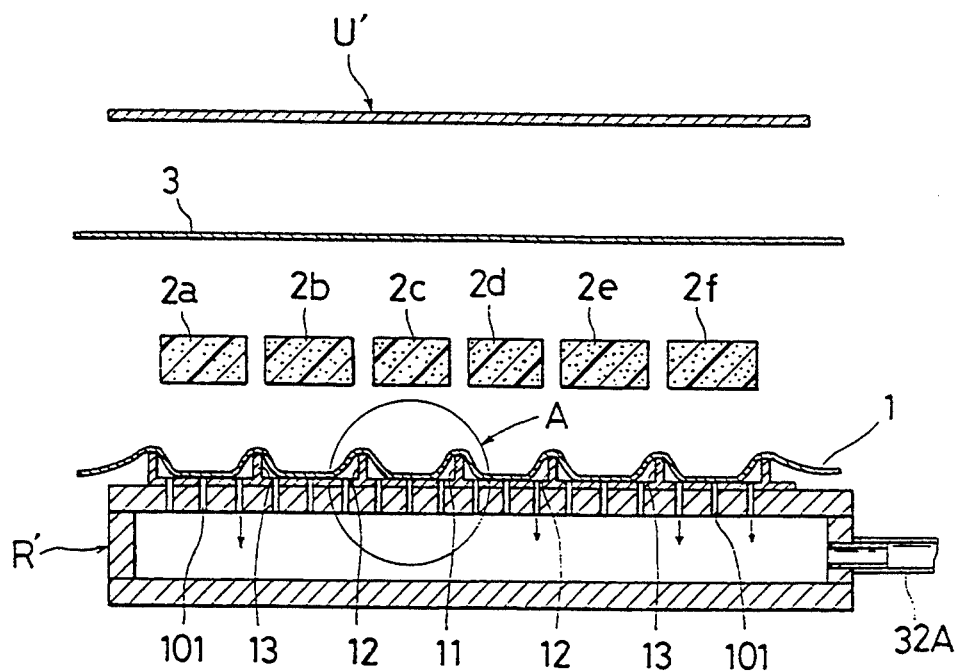
Figure 1D:
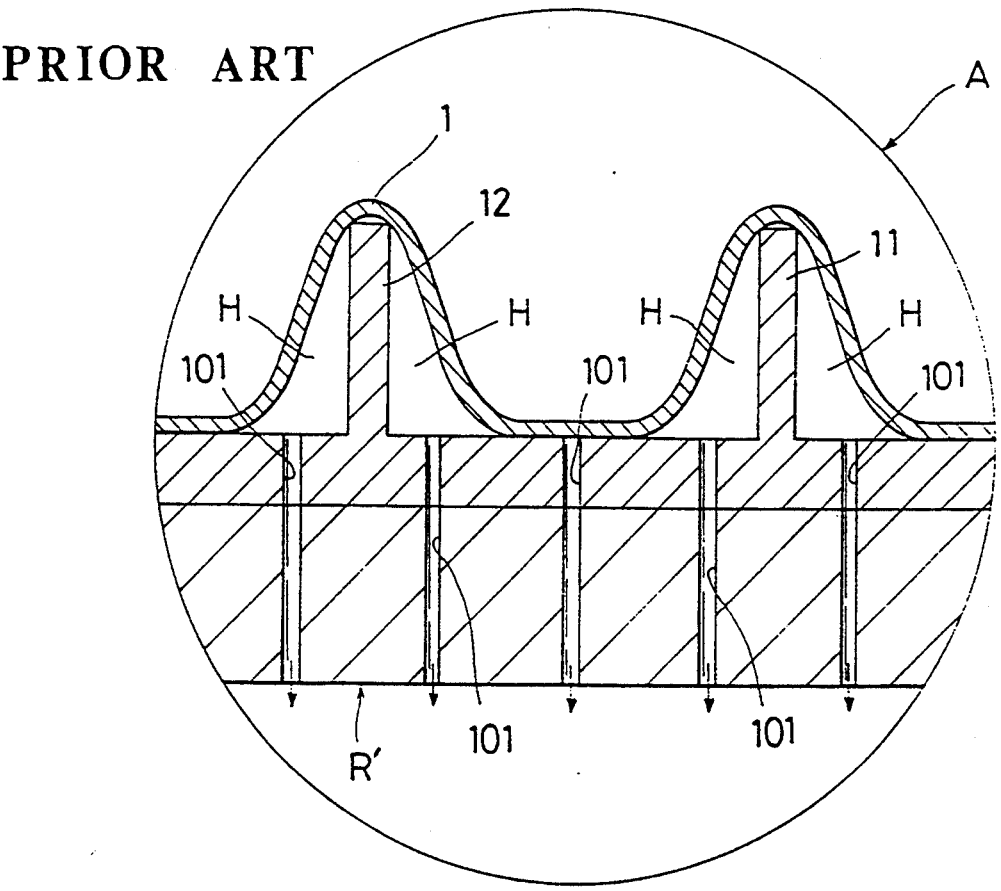

The present invention as embodied in the figures is directed to an improvement upon the second prior art high-frequency welding device as shown in FIGS. 1(C) and 1(D). Thus, all like designations in FIGS. 1(C) and 1(D) correspond to all like designations to be given hereinafter and a description on the common parts and members between the prior art and present invention is deleted for simplicity.

FIG. 3 shows a whole system for effecting the high-frequency welding to form a trim cover assembly with decorative patterns of recessed grooves thereon, in accordance with the present invention. This is simply an example, not limitative, and any other systems may be adopted insofar as they serve a purpose to be explained later. The system basically comprises a pair of spaced-apart lower dies (R')(R') identical to those of the aforementioned second prior art, which are movable forwardly and backwardly with respect to an upper die assembly (U''), a novel part of the present invention, a pair of spaced-apart pressure plates (P)(P), each being pivoted or hinged at its lower base end to a frame of system, as shown, in a manner rotatable vertically in the arrow direction, and an air suction device (32, 33) to which is connected the tube (32A) of each lower die (R').

As viewed from FIG. 3, the upper die assembly (U'') is disposed at a center of the system, between the right-side pressure plate (P) and lower die (R') and the left-side ones (P)(R'), and further supported by four leg frames (61) at a higher level than the two lower dies (R')(R'). The upper die assembly (U'') comprises a stationary base plate (30), a plurality of movable upper die elements (21, 22, 22', 23, 23' . . . ) which pass through the base plate (30) and are moved vertically therethrough by the respective cylinders (C1, C2, C2', C3, C3' . . . ), guide rods (51) each being provided on the plural upper die elements and penetrating through the base plate (30) in a vertically movable manner, and a plurality of actuators (CA) provided on the base plate (30), which are adapted to actuate the corresponding cylinders (C1, C2 . . . ) under a suitable computerized control.

Referring now to FIG. 2 and also FIGS. 4 and 5, a specific explanation will be given about an arrangement of the plural upper die elements (21, 2, 22' . . . ) and associated cylinders (C1, C2, C2' . . . ), with respect to the projected electrode portions (11, 2, 12', 13, 13', 14 and 14') of the lower die (R').

It is noted here that, as can be seen from FIG. 3, the upper die elements are each formed from a rectangular parallelopiped material and the electrode portions are each of elongated plate material, erecting from the base plate portion (14a) fixed upon the upper surface of lower die (R').

Of the upper die elements, the central one designated by (21) is disposed centrally at a point corresponding to the central first electrode portion (11). The central upper die element (21) is formed with a recessed engagement part (21A), into which the central electrode portion (11) is to be engaged.

Figure 4:
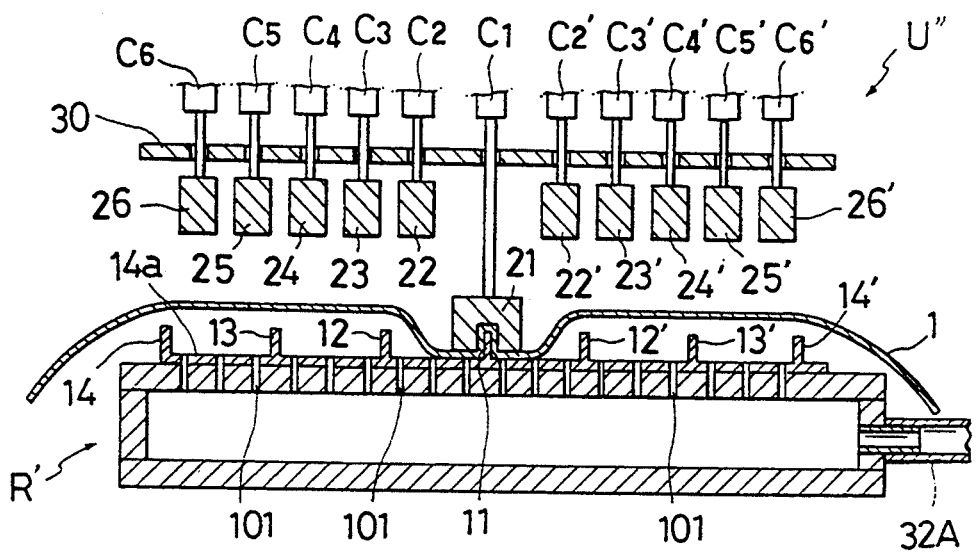
FIG. 4 is a schematic sectional view explaining a first step of pressing a top cover layer.
Figure 5:
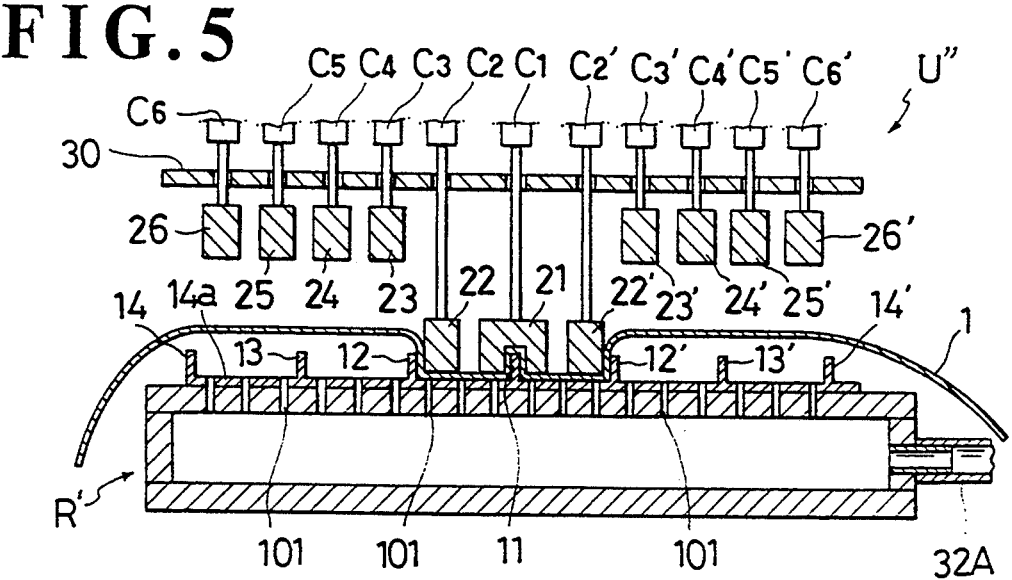
FIG. 5 is a schematic sectional view explaining a second step of pressing the top cover layer.

According to the present invention, it is so arranged that, as viewed from FIG. 2, a pair of upper die elements (22)(22') form a first set, a pair of upper die elements (23)(23') form a second set, a pair of upper die elements (24)(24') form a third set, a pair of upper die elements (25)(25') form a fourth set, and a pair of most outward upper die elements (26)(26') form a fifth set, and that those five sets of two upper die elements may be moved vertically, independently of one another as understandable from FIGS. 4 and 5. Of course, likewise, the cylinders (C1, C2 . . . ) are arranged as such in correspondence with the respective associated upper die elements; namely, for instance, the two cylinders (C2)(C2') form a part of the foregoing first set. Hence, the actuators (CA) are operated under a proper control such as to firstly actuate the central cylinder (C1) to lower the central upper die element (21), secondly actuate a first set of cylinders (C2)(C2') to lower a first set of upper die elements (22)(22'), thirdly actuate a second set of cylinders (C3)(C3') to lower a second set of upper die elements (23)(23'), in sequence, until a fifth set of upper die elements (26)(26') is lowered.

In this connection, as understandable from FIG. 2, it is essential that both central and first set of upper die elements (21)(22)(22') are disposed within the first width (W1+W2) between the first right and left electrode portions (12)(12'). Also, both second and third sets of upper die elements are arranged such that the left-side paired ones (22)(23) thereof are disposed within the left-side second width (W2) between the second left-side and third left-side electrode portions (12)(13), whereas the right-side paired ones (22')(23') thereof are disposed within the right-side second width (W2) between the second right-side and third right-side electrode portions (12')(13'). Likewise, further, both fourth and fifth sets of upper die elements elements are arranged such that the left-side paired ones (24)(25) thereof are disposed within the left-side third width (W3) between the third left-side and fourth left-side electrode portions (13)(14), whereas the right-side paired ones (24')(25') thereof are disposed within the right-side third width (W3') between the third right-side and fourth right-side electrode portions (13')(14').

Figure 6:
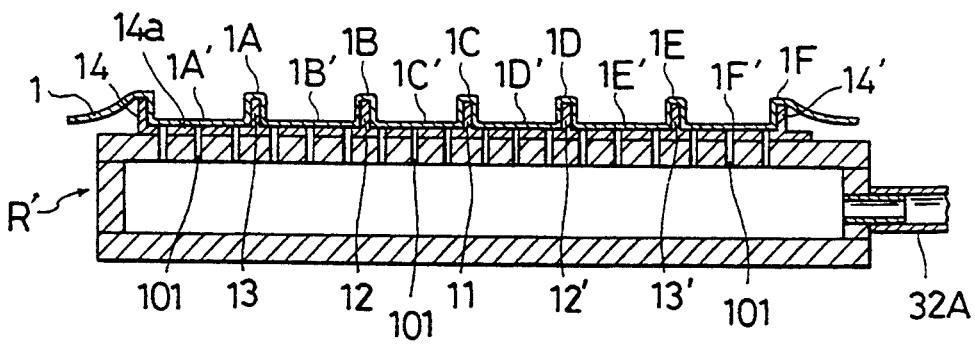
FIG. 6 is a schematic sectional view showing the top cover layer to be pressed on the whole.
Figure 7:
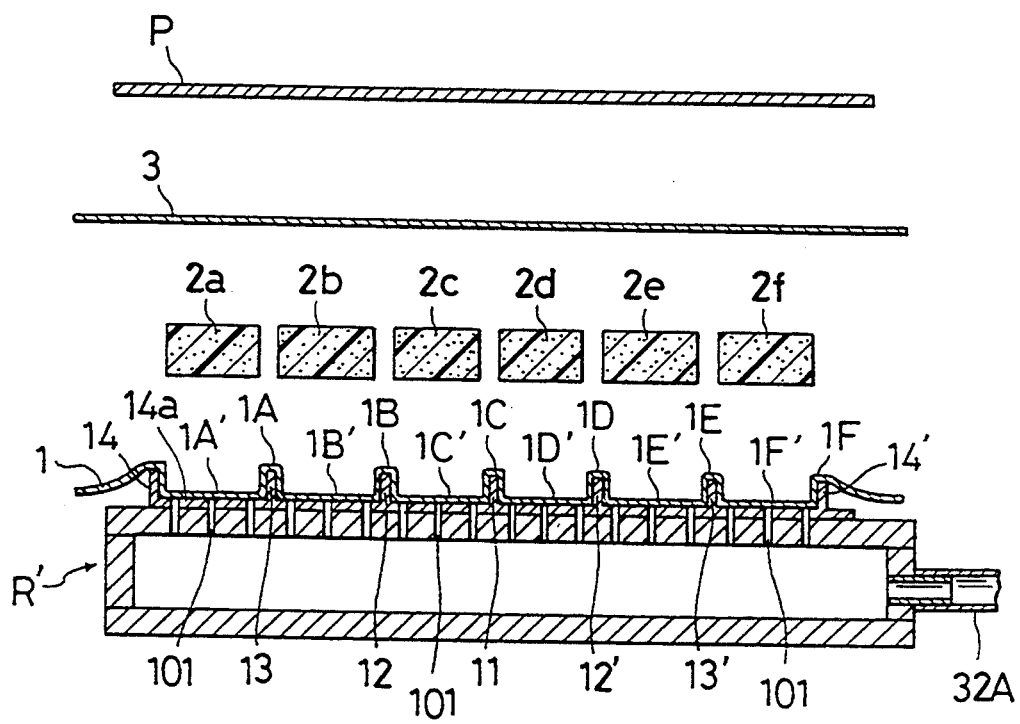
FIG. 7 is a schematic sectional view showing steps of fixing a wadding and wadding cover to the pressed top cover layer.

In operation, as understandable from FIG. 3, one of the lower dies (R or R') is firstly transferred by a carrier (31), with the top cover layer (1) placed thereon, towards the upper die assembly (U") and positioned therebelow, so that the electrode portions (11, 12 . . . ) of the lower die are located at a point establishing the above-described mating relation with the upper die elements (21, 22, 22' . . . ). Then, as shown in FIG. 4, the central upper die element (21) is lowered by the central cylinder (C1) towards the central electrode portion (11), thus engaging the latter (11) into the recessed part (21A) of the former (21), whereupon the top cover layer (1) is pressed at its central vertical line, from both sides, by both upper die element (21) and lower die (R'), so as to produce a central recessed groove pattern (1C) in the top cover layer (1) as seen in FIG. 7. Thus, as best seen in FIG. 4, the central vertical area of top cover layer (1) is sufficiently brought to a close contact with all the surfaces of central electrode portion (11) and the adjacent area of base plate portion (14a). Subsequent thereto, as shown in FIG. 5, the first set of two upper die elements (22)(22') is lowered to pressingly retain the remaining section of top cover layer within the region between the left-side and right-side second electrode portions (12)(12'), whereupon the central area of top cover layer (1), occupying about ⅔ area of the same, is neatly stretched within such region, with the top cover layer (1) in close contact on all the lower corners of the central, second left-side and second right-side electrode portions (11)(12) (12'). The same operations will be done with respect to all the remaining upper die elements (23, 23', 24, 24', 25, 25', 26, 26') and electrodes portions (13, 13', 14, 14'), so that most area of the top cover layer (1) is retained in a close contact upon the upper die surface of lower die (R') without any slackened area therein. At the completion of this operation, the air suction device (32, 33) is operated to suck an air within the lower die (R') in order to forcibly draw the thus-retained area of top cover layer (1) to the lower die (R') . This insures a complete uniform securement of such retained area of top cover layer (1) upon the electrode die surface of lower die (R') . Then, all the upper die elements (21, 22, 22 ' . . . ) are raised away from the lower die (R') , and the top cover layer (1) lies neatly upon the electrode die surface of lower die (R') as shown in FIG. 6. Namely, the top cover layer (1) is bent sinuously by the plural electrode projected portions (11, 12, 12', 13, 13', 14, 14') and plural interval sections of base plate portion (14a) defined among those electrode projected portions, thereby defining plural recessed groove pattern portions (1A, 1B, 1C, 1D, 1E, 1F) and plural crest portions (1A', 1B', 1C', 1D', 1E', 1F') in the top cover layer (1) .

Finally, as shown in FIG. 7, the separate foam waddings (2a)(2b)(2c)(2d)(2e)(2f) are fitted into the foregoing crest portions (1A')(1B')(1C')(1D')(1E') (1F') of top cover layer (1) secured on the lower die (R'), respectively, after which, the wadding cover (3) is placed over the thus-fitted waddings and the pressure electrode plate (P) is rotated downwardly to press together all three layers (1), (2a, 2b . . . ) and (3), so that those three layers are subject to a high-frequency welding.

The high-frequency welding is not limitative in the present invention, and both pressure electrode plate (P) and projected electrode portions (11, 12 . . . ) may be made of a mere rigid metallic plate, in which case, an adhesive should be applied to the whole surfaces of top cover layer (1) in order that the waddings (2a, 2b . . . ) may be bonded to the crest portions (1A', 1B' . . . ) thereof, respectively, and further the wadding cover (3) be bonded at the recessed groove portions (1A, 1B . . . ) thereof.

Figure 8:
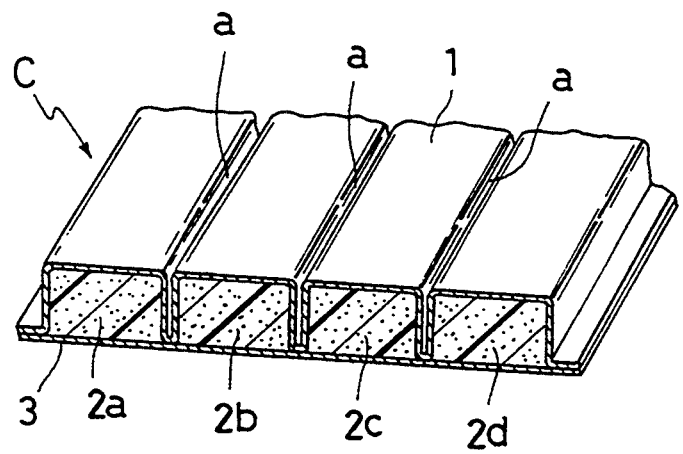
FIG. 8 is a partly broken perspective view of resulting trim cover assembly formed according to the present invention.

Finally, after the welding or bonding process, the pressure plate (P) is raised from the lower die (R'), and then, the trim cover assembly thus formed is taken out from the lower die (R'), with the result that there is obtained a finished trim cover assembly (C) having plural clear-cut patterns (a) of recessed grooves formed therein, as illustrated in FIG. 8.

It is to be appreciated that, in accordance with the present invention, the top cover layer (1) starts to be laid on the center point of the lower die (R'), while pressing a portion of the top cover layer (1) to the central projected protion (11), thereby creating a first recessed groove pattern (1C) without clearance, after which, the top cover layer (1) is subject to a progressive stretching in the outward direction from and symmetrically relative to such central point by the sequential pressing operations of the plural upper die elements (22, 22' . . . ) at every symmetrical pair of projected portions (i.e. (12, 12')→(13, 13')→(14, 14')). In this way, it is effectively possible to not only draw the portions of top cover layer (1) completely into both lower corners of each projected portion (11, 12, 12' . . . ), but also stretch the top cover layer (1) naturally without cause of creating slackened portions therein. Accordingly, the top cover layer (1) is formed with a plurality of recessed groove pattern portions (1A, 1B . . . ) in a completely clear-cut manner, thus avoiding the problem of clearances (H) found in the prior art.

For the above purpose, as shown, it is important that each of the projected portions (12, 12' .,.) subsequent to the central one (11) is sandwiched between adjoining two upper die elements, to thereby completely draw the corresponding portions of top cover layer (1) into both lower corners of the projected portion. In this respect, preferably, a proper slight clearance is given between the lateral side of projected portion (12, 12' . . . ) and the mating side of upper die element (22, 22'...), considering the thickness of top cover layer (1).

It is noted that the top cover layer (1) is made of an non-permeable leather material which is suited for the air sucking operation stated above.

While having described the present invention as above, it should be understood that the invention is not limited to the illustrated embodiment, but any other modifications, replacements and additions may be applied thereto structurally without departing from the scope and spirit of the appended claims. For example, the air suction device (32, 33) may not be used because of the above-described arrangement for contacting the top cover layer (1) closely upon the working surface of lower die (R'). The recessed groove patters shown may be altered to other possible patterns.

What is claimed is:

1. A method for forming a trim cover assembly for an automotive seat, in which said trim cover assembly is of a three-layer lamination type comprising a top cover layer, a foam wadding and a wadding cover, said method comprising the steps of:

providing a lower die having a working surface formed with a plurality of projected portions thereon, wherein said plurality of projected portions extend in a longitudinal direction of said lower die and comprise a first central projected portion defined at a central line of said working surface and a predetermined number of other spaced-apart projected portions defined at the same working surface, wherein said spaced-apart projected portions are arranged outwardly from and symmetrically relative to said first central projected portion, generally in parallel with one another in a width-wise direction of said lower die;

providing a plurality of upper die elements which are movable toward and away from said lower die, including a first central upper die element having a recessed portion into which said first central projected portion of the lower die is to be engaged, and a predetermined number of other spaced-apart upper die elements disposed outwardly from and symmetrically relative to said first central upper die element;

placing said top cover layer upon said lower die;

then, lowering said first central upper die element towards said lower die such that a central part of said top cover layer is pressed between said recessed portion of said first central upper die element and said first central projected portion of said lower die, so as to stretch the thus-pressed central part of said top cover layer into a first recessed groove pattern without any clearance;

then, lowering a first pair of said other upper die elements on opposite sides of said first central upper die elements towards a first pair of said other projected portions of said lower die which are disposed on opposite sides of said first central projected portion, such as to sandwich each of said first pair of upper die elements between said first central projected portion of said lower die and one of said first pair of other projected portions, respectively, thereby pressing a corresponding area of said top cover layer against said lower die working surface;

lowering a second pair of said other upper die elements, likewise, towards a second pair of said other projected portions of said lower die, such as to sandwich each of said second pair of upper die elements between one of said first pair of said other projected portions and a corresponding one of said second pair of said other projected portions, thereby pressing a corresponding area of said top cover layer against said lower die working surface;

making the same lowering operations for other pairs of said upper die elements, in sequence, with respect to other pairs of said other projected portions of said lower die, in such a manner that they are lowered one pair after another pair in an outward direction from and symmetrically relative to said central line of said lower die, so that the whole top cover layer is neatly stretched on said working surface of said lower die in conformity with and in a close contact with said plural projected portions;

thereafter, drawing and securing the thus-stretched top cover layer to said lower die by use of an air suction device communicating with said lower die;

then, raising all said plurality of upper die elements thus lowered, from said lower die;

placing said foam wadding and said wadding cover, in this order, upon said top cover layer secured on said lower die;

lowering and pressing a pressure plate against all said top cover layer, foam wadding and wadding cover on said lower die, so as to fix them all together integrally to produce the trim cover assembly, whereby a clear-cut distinctive pattern of recessed grooves are created in a surface of said trim cover assembly.

2. The method as defined in claim 1, wherein said lower die and said pressure plate are formed as electrode means of a high-frequency welding device, and wherein said top cover layer, foam wadding and wadding cover are welded together integrally under a high frequency.

3. The method as defined in claim 1, wherein said method further includes the step of applying an adhesive to the whole surface of said top cover layer which has been pressed by said plurality of upper die elements.

4. The method as defined in claim 1, wherein said foam wadding comprises a plurality of separate foam wadding pieces, and wherein, during said step of placing said foam wadding and wadding cover on said pressed top cover layer on said lower die, each of said separate foam wadding pieces is fitted to respective portions of said top cover layer which have been defined in intervals among said projected portions on said lower die.

* * * * *